United States Patent [19]

Dallaire et al.

[11] Patent Number: 5,115,955
[45] Date of Patent: May 26, 1992

[54] SKI RACK WITH ADJUSTABLE RETENTION POST

[75] Inventors: Michel Dallaire; Michael Santella; Michel Swift, all of Montréal, Canada

[73] Assignee: 167848 Canada Inc., Quebec, Canada

[21] Appl. No.: 469,911

[22] Filed: Jan. 24, 1990

[51] Int. Cl.⁵ .............................. B60R 9/00
[52] U.S. Cl. .................... 224/324; 224/315; 224/322; 224/329; 224/917
[58] Field of Search ............ 224/917, 324, 315, 322, 224/323, 329, 330

[56] References Cited

U.S. PATENT DOCUMENTS

| | | |
|---|---|---|
| 3,132,780 | 5/1964 | Binding . |
| 3,275,160 | 9/1966 | Zürker ........................ 224/917 |
| 3,348,747 | 10/1967 | Vuarchex ................... 224/917 |
| 3,378,182 | 4/1968 | McMiller . |
| 3,726,410 | 4/1973 | Binding et al. . |
| 3,848,785 | 11/1974 | Bott ............................. 224/917 |
| 4,278,192 | 7/1981 | Sazegar ...................... 224/917 |
| 4,372,470 | 2/1983 | Dallaire . |
| 4,720,031 | 1/1988 | Zimmerman . |
| 4,765,521 | 8/1988 | Finnegan . |

Primary Examiner—Linda J. Sholl
Attorney, Agent, or Firm—Longacre & White

[57] ABSTRACT

A ski rack comprising a support base member having one or more adjustable ski retention posts secured thereto and extending vertically thereabove. One or more abutment members extend vertically from the base member and disposed in spaced aligned relationship with a respective one of the retention posts. The retention posts each have flexible biasing fingers which project toward the abutment members in a ski receiving space defined between the posts and the abutment members for applying clamping pressure against a pair of skis supported on the base member in the ski receiving space. A bridge member extends above and across the abutment members and the retention posts. Attachment elements are disposed adjacent opposed ends of the ski rack for securing same to a vehicle.

30 Claims, 4 Drawing Sheets

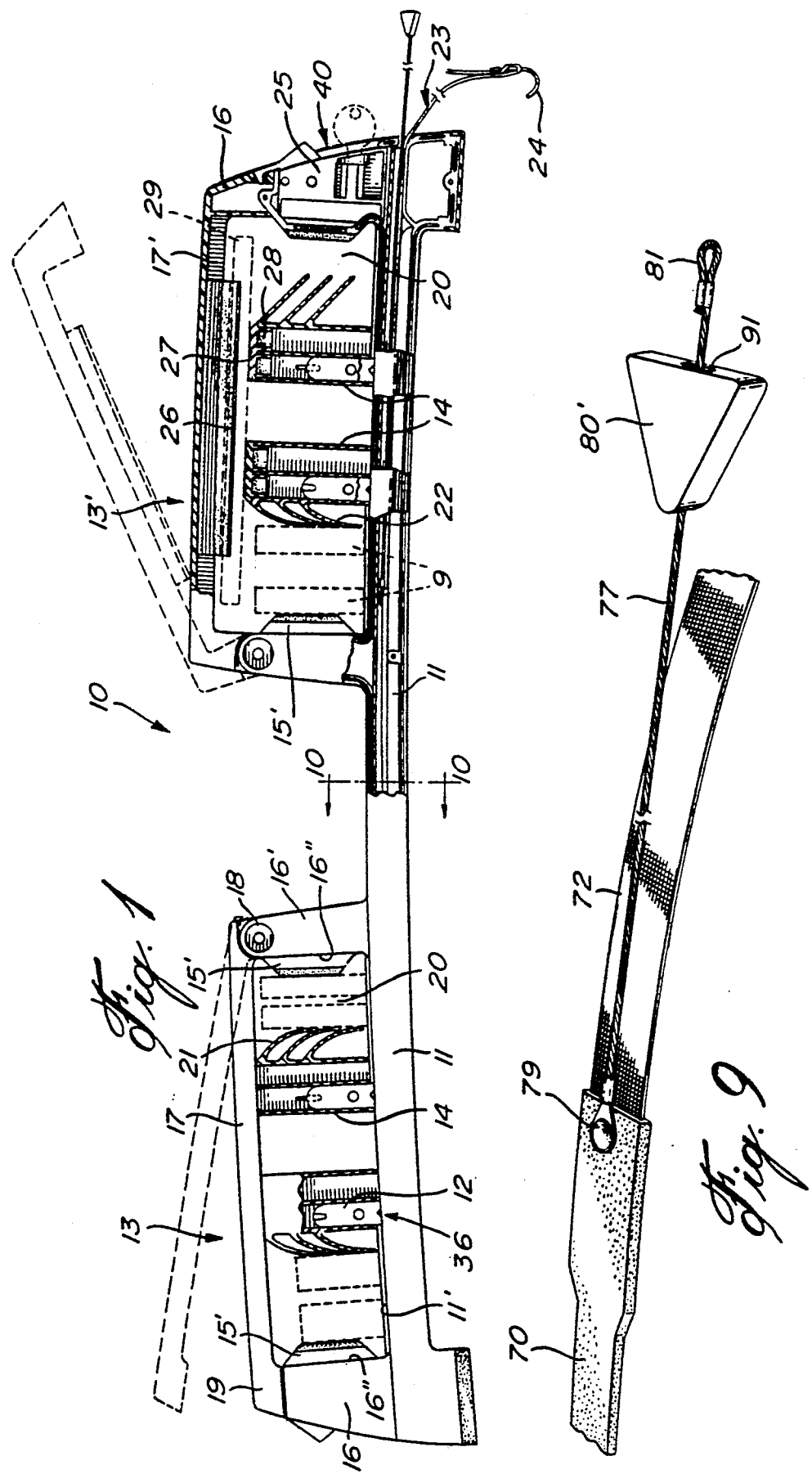

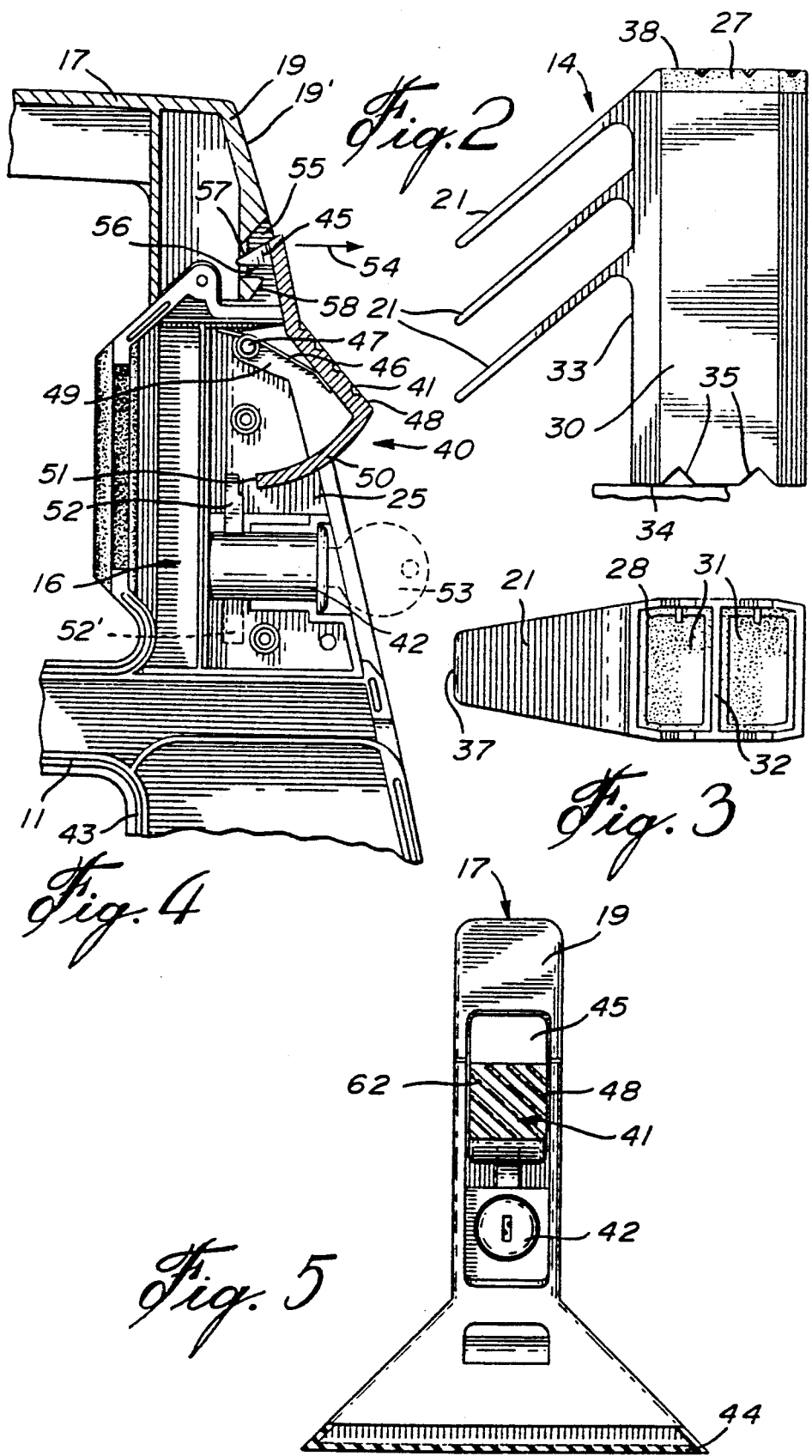

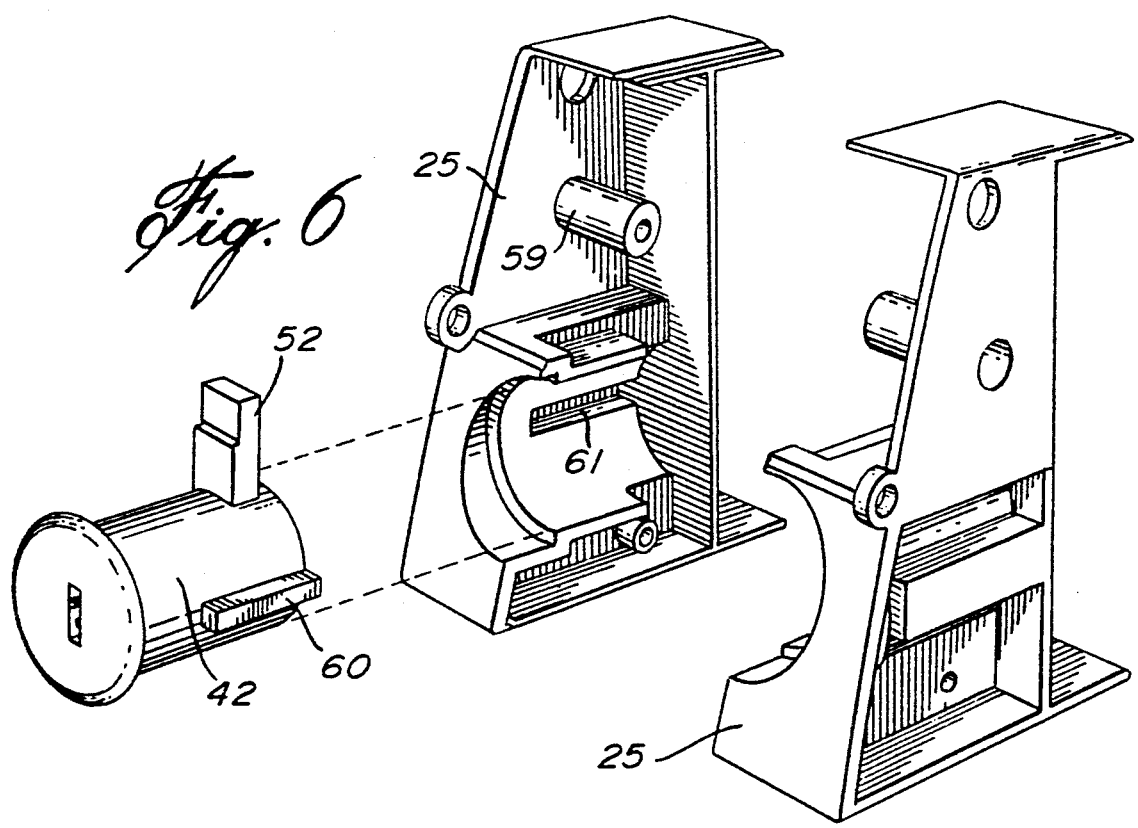
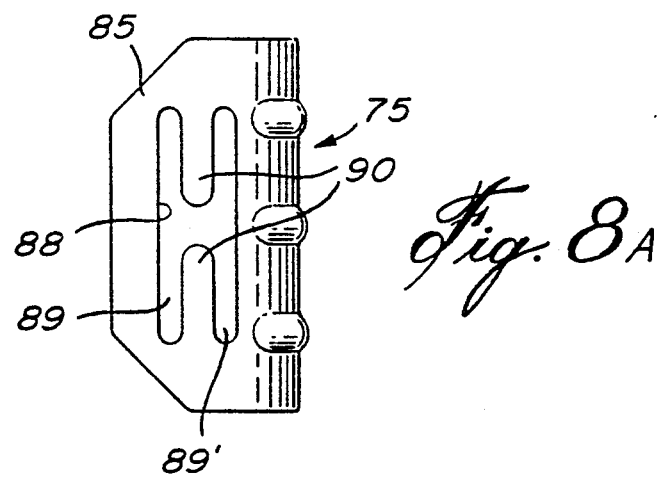
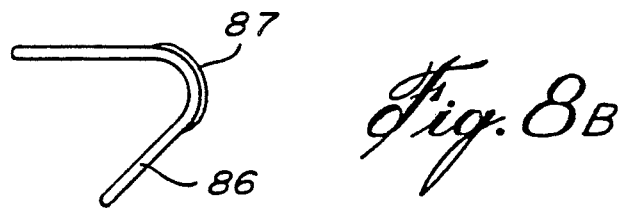

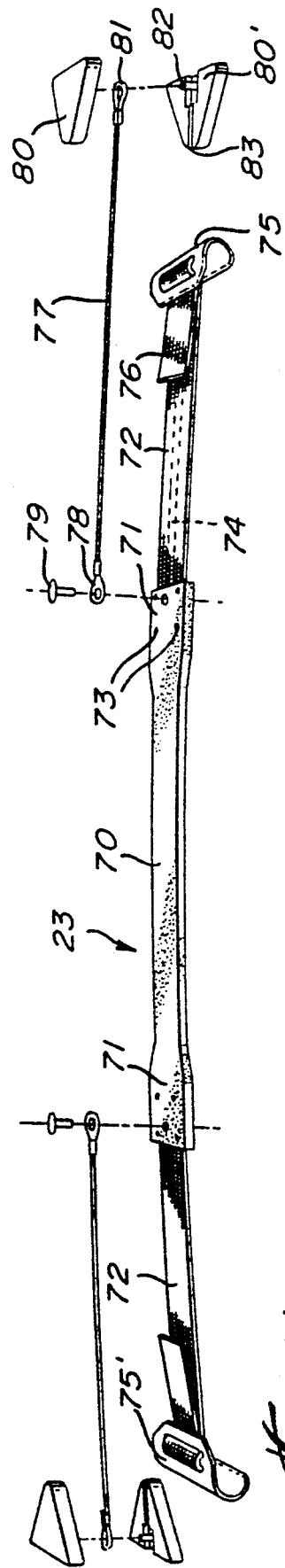
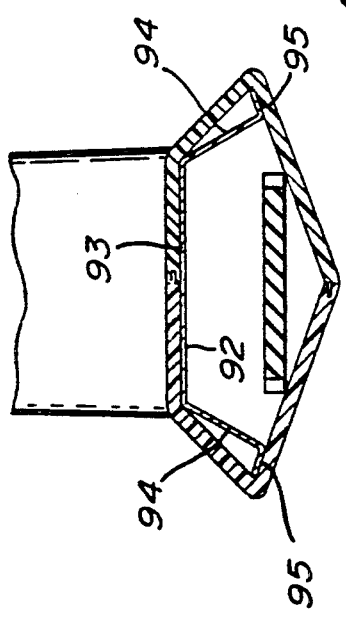
Fig. 7
Fig. 10

SKI RACK WITH ADJUSTABLE RETENTION POST

BACKGROUND OF INVENTION

1. Field of the Invention

The present invention relates to an improved ski rack for supporting one or more pairs of skis on a vehicle roof or other surface portions of the vehicle and wherein the skis are retained between adjustable retention posts whereby the size of a ski receiving space, in which the skis are secured, is made adjustable to receive pairs of skis having varying widths when disposed in their usual side-by-side carrying relationship.

2. Description of Prior Art

Various types of ski racks are known for carrying one or more pairs of skis over a car rooftop. Usually, the ski rack consists of a bridge member having two or more clamping members extending vertically thereover for clamping skis transversely between two racks secured to a rooftop of a vehicle. However, various disadvantages are common with each of the known types of ski racks and the ski rack of the present invention was conceived to overcome particular ones of these disadvantages.

A main disadvantage of known ski racks is that the clamping space where skis are to be clamped is made of a constant size and often it is not possible to achieve clamping pressure of pairs of skis positioned within such space if the width of the nested skis are too narrow. Accordingly, the skis are not properly retained by the rack and this becomes hazardous when transporting same on a moving vehicle as they can be dislodged from the ski rack and cause serious injury or car accidents.

Another disadvantage of known ski racks is that many of these ski racks are not provided with connecting means whereby to attach the ski racks to the vehicle to prevent the theft thereof. Another disadvantage is that the means provided for attaching the ski rack to a vehicle roof, and particularly to the gutters of the roof, are difficult to install. The attachment clamps also often become accidentally disconnected and this again can be very hazardous.

A still further disadvantage of known ski racks of the prior art is that the ski rack cannot be left unattended on the rooftop of a vehicle with skis secured therein. There is therefore the need for a ski rack wherein skis can be locked onto the rack and the rack attached to the vehicle whereby the skis and the rack cannot be stolen.

There is also the need to provide a ski rack which is easy to install, easy to operate and wherein the skis can be clamped to the rack without the need of having to engage clamping members which are difficult to engage, particularly in very cold weather. Also, with many prior art racks, the clamping means is made of a plastic material which becomes brittle at very cold temperatures and often breaks, making the clamp and often the entire rack useless.

Another disadvantage of the known racks of the prior art is that these have not been provided with clamping means to carry large ski boards as well as small narrow cross-country skis. There is also the need to provide a ski rack which is easy to assemble and disassemble whereby replacement parts can be easily fitted.

SUMMARY OF INVENTION

It is a feature of the present invention to provide a ski rack which substantially overcomes all of the above-mentioned disadvantages of the prior art.

According to the above features, from a broad aspect, the present invention provides a ski rack comprising a support base member having one or more fixed support posts secured to the support base member at predetermined positions and extending vertically therefrom. One or more removable ski retention posts are connected to a respective one of the fixed support posts. One or more fixed abutment members extend vertically from the base member and are disposed in spaced parallel relationship with a respective one of the retention posts. The retention posts each have flexible biasing means which project toward the abutment members in a ski receiving space defined between the posts and the abutment members for applying clamping pressure against a pair of skis supported on the base member in the ski receiving space. A displaceable bridge member extends above and across the abutment members and the retention posts to provide access to the ski receiving space for insertion and removal of skis. Attachment means is provided to secure the rack to a vehicle.

According to a still further broad aspect of the present invention, there is provided a key operated lock means to lock a bridge member across the ski receiving space. The key operated lock means is comprised by a pivotally biased locking lever having a locking finger normally biased to a locking position by spring means and to engage with the locking free end of the bridge bar. A locking lever disengaging arm is connected to the locking finger and pivotally mounted on a pivot in the outer attachment post for retracting the locking lever from engagement by causing pivotal movement of the lever. A key operated arresting member is provided for obstructing the disengaging arm to prevent disengagement of the locking finger when placed in a locked position by a key.

According to a still further broad aspect of the present invention, the attachment means for securing the rack to a rooftop of a vehicle is comprised of a tensioning assembly formed by a stretchable member which is retained captive in the support base member of the rack. Strapping means is secured at opposed ends of the stretchable member and has an attachment end portion protruding from each of the opposed ends of the rack. A retention clamp is secured to each attachment end portion for securement to a vehicle. A rack securement member is attached to the tensioning assembly for stretching the stretchable member. The securement member has an enlarged hand grasping member secured to a free end thereof for pulling on the cable. The hand grasping member is positionable inside a vehicle with the cable extending through a space between a displaceable closure of the vehicle to secure the ski rack to the vehicle.

BRIEF DESCRIPTION OF DRAWINGS

A preferred embodiment of the present invention will now be described with reference to the accompanying drawings, in which:

FIG. 1 is a fragmented side view illustrating the construction of the ski rack of the present invention;

FIG. 2 is a side view of the adjustable ski retention posts of the present invention;

FIG. 3 is a top view of FIG. 2 with the friction cap having been removed from the post housing;

FIG. 4 is a fragmented side section view showing the construction of the key operated lock;

FIG. 5 is an end view of the ski rack illustrating the position of the lock;

FIG. 6 is an explosive perspective view illustrating the construction of the lock housing with the key cylinder;

FIG. 7 is a perspective view illustrating the construction of the tensioning assembly;

FIG. 8A is a plan view showing the construction of the clamp and its strap attaching wall;

FIG. 8B is an end view of the clamp of FIG. 8A showing the configuration thereof;

FIG. 9 is a perspective view showing the construction of the pulling cable and the enlarged hand-grasping member as secured to the stretchable member; and FIG. 10 is a cross-section view illustrating the configuration of the reinforcing metal bridge secured within the support base member.

DESCRIPTION OF PREFERRED EMBODIMENTS

Referring now to the drawings, and more particularly to FIG. 1, there is shown generally at 10, the ski rack of the present invention and comprised of a support base member 11 having formed integral therewith a pair of support posts 12 disposed spaced apart in a ski carrier section 13 and 13' provided on a respective side of the support base member. An adjustable ski retention post 14 is secured to each of the support posts 12 in transversely adjustable manner, as will be described later. These posts 14 extend vertically above the support base member 11 and are spaced from an associated one of abutment members 15.

The abutment members 15 are constituted by vertical bearing surfaces, herein rubber inserts 15', secured within the bridge member attachment posts 16 and 16'. Each section 13 and 13' has a hinged bridge member 17 which is provided with a hinge connection 18 secured to an inner one of the bridge members, herein bridge member 16', and has a detachably connected locking free end 19 which secures in a lock mounted in the outer attachment post 16, as will be described later.

The bearing members 15' are disposed in spaced aligned relationship with a respective one of the retention posts 14 and define therebetween a ski receiving space 20 for receiving a pair of skis 9 therethrough. Each of the retention posts is provided with flexible biasing means, in the form of one or more downwardly angulated projecting flexible fingers 21, projecting toward its associated abutment member 15' for applying clamping pressure against the skis 9 positioned in the ski receiving space 20. Because these fingers 21 are projecting downwardly, it is easy to fit the pair of skis within the space 20 as these arms will bend downwards in a clamping position, as shown at 22, when the skis are introduced from the top end of the space to apply clamping pressure from opposed sides of the pairs of skis, that is, between the bearing member 15' and the flexible fingers 21. Attachment means in the form of a tensioning strap assembly 23 is provided at opposed ends of the rack for securing the rack to a vehicle roof by engaging the clamps 24 within the conventional rain gutters normally provided over the top edge of the side doors of the vehicle. Of course, the rack may be secured to another convenient part of the vehicle, such as the trunk lid, as is well known in the art.

The base member 11, the support posts 12 and the bridge member attachment posts 16 are integrally formed from two longitudinal plastic molded shells interconnected together with the bridge members 17 and a key operated lock housing 25 disposed in the outer ones of the bridge members 16. The vertical bearing members 15' are each constituted by vertical rubber bumpers which are secured in the vertical end wall 16'' of each of the bridge members 16 and 16' and are introduced during the assembly of the longitudinal shells.

As shown in FIG. 1, there are two embodiments of the ski carrier sections 13 and 13'. As shown in the embodiment illustrated by the section 13, the bridge bar 17 is disposed immediately over the top wall of the adjustable ski retention posts 14. In the embodiment illustrated in the section 13', the bridge bar 17' is spaced from the top end of the ski retention post 14 and an elongated flexible gasket 26, of flexible friction material such as rubber, is retained in a lower wall of the bridge bar 17' and spaced in alignment with the posts 14. A friction cap 27 is also removably secured in a top end 28 of the ski retention posts 14 and these shoes together with the elongated gasket 26 constitute a further clamp for supporting a flat article, such as a ski board 29 therebetween and over the ski receiving spaces 20. Alternatively, another pair of skis could be clamped with each ski disposed flat over the friction cap 27 of each post 14 and clamped thereon by the flexible gasket 26 when the bridge arm 17' is closed Referring now to FIGS. 2 and 3, there will be described the construction of the adjustable ski retention posts 14. As herein shown, each retention post is comprised of a post housing 30 which is a substantially hollow rectangular open-ended housing defining therein a pair of spaced chambers or cavities 31 separated by a division wall 32 so as to form two cavities of equal size and cross-section. These cavities are dimensioned to be fitted over and receive a support post 12 in close friction fit therein. As is also herein shown, there are three flexible fingers 21 extending from an inner side wall 33 of the housing 30. These flexible fingers 21 extend in spaced parallel relationship to one another and spaced from the bottom edge 34 of the housing a predetermined distance to provide space for the displacement of the lower one of the fingers 21 when bent downwardly by the introduction of skis 9 in the space 20. Position indicating means in the form of triangular notches 35 are provided in the lower bottom edge 34 of the housing and disposed centrally with respect to a respective one of the cavities 31. These triangular notches 35 constitute positioning means together with printed matter provided thereagainst on the housing side wall to indicate to the user which of the notches 35 should be aligned with a position indicator ridge 36 disposed on the top surface 11' of the support base member 11 so as to provide a ski receiving space opening 20 for receiving either alpine-type skis or cross-country skis which are of different widths when nested together. The flexible fingers also permit adjustment of the width of the space 20 as it permits nested skis of different widths to be received and clamped in the space.

As shown in FIG. 3, the flexible fingers 21 are of thin web-shape and are tapered to terminate in a narrow transverse abutment end edge 37. The tapered shape of these flexible fingers improves the flexible rigidity thereof. Of course, it is within the ambit of the present invention to provide fewer than three of these flexible fingers. Also, the friction cap 27 may be formed integral with the post housing 30 or formed as an insert for friction fit within the open top end of the cavities 31. The friction cap 27 may also have a ribbed outer surface 38 to provide better frictional retention.

Referring now to FIGS. 1 and 4 to 6, there will be described the construction and operation of the key operated lock assembly 40. As better seen in FIG. 4, the lock assembly comprises the lock housing 25 to which is connected a pivotally biased locking lever 41 and a key cylinder 42. As previously described, the lock housing 25 is disposed and retained between the two shells of the ski rack during assembly and disposed in the outer ones of the attachment posts, herein attachment post 16. These posts are provided with a foot section 43 to which is removably secured a foot pad 44 whereby to retain the base member 11 elevated.

The locking lever 41 is provided with a locking finger 45 which is normally biased to a locking position, as shown in FIG. 4, by spring means in the form of a spring member 46 retained about a pivot pin 47 secured within the lock housing 25. The spring member 46 is biased against a locking lever disengaging arm 48 formed integral with the locking finger 45 and pivotally mounted about the pivot pin 47 through an inner mounting rib or ribs 49. A lower arcuate arresting wall 50 is formed in a lower portion of the locking lever disengaging arm 48. This arresting wall 50 has an abutment end 51 which is aligned with an arresting member 52 which is axially displaceable for obstruction with the abutment end 51 of the arresting wall 50 to prevent the lock lever disengaging arm 48 from being pivoted inwardly of the housing 25 to disconnect the locking finger from the locking free end 19 of the bridge member 17. The arresting member is an arresting bar 52 which is located in the key lock cylinder 42 and axially displaceable therein by rotation of the key 53, in a manner well known in the art. By rotating the key 53 in a specific direction, the arresting bar 52 will be moved inwardly of the cylinder 42 and extend from the opposed side of the cylinder as shown at 52'. Accordingly, there is no longer any obstruction to the abutment end of the arresting wall 50 and the disengaging arm 48 can be pushed inwardly of the housing 25 against the spring action of the spring member 46. By doing so, the locking finger 45 is retracted in the direction of arrow 54 to unlock with the locking slot 55 provided in the locking free end 19 of the bridge member 17 to permit the bridge member to be fitted upwardly, as shown is FIG. 1.

As shown in FIG. 4, the locking slot 55 is provided in an outer wall 19' of the locking free end 19 of the bridge bar 17.

The locking finger 45 of the locking lever 41 has a slot-engaging end which defines a lower retention wall 56 to engage within the locking slot 55 to secure the free end 19 of the bridge member 17 locked on a top wall of the outer attachment post 16. The slot-engaging finger is also provided with a sloped outer wall 57 for sliding engagement with an angulated pusher edge 58 provided on the locking free end of the bridge bar to cause the locking finger 45 to pivot outwardly, in the direction of arrow 54, against the spring-bias when the free end 19 is lowered on the top wall of the attachment post 16 with the application of hand pressure by the user. The locking finger 45 is thus automatically engaged into the slot 55 when positioned in alignment therewith.

As shown in FIG. 6, the lock housing 25 is constituted by two opposed housing sections having a hinge pin locating cylinder portion 59 for retaining the pivot pin 47 therein. The key cylinder 42 is also provided with locating arms 60 for retention within cavities 61 so that the cylinder 42 is always at a predetermined position with the arresting member 52 also aligned at a predetermined position. As can also be seen from FIG. 5, the locking finger and disengaging arm of the lever 41 are integrally formed and have a flat outer wall 62 for ease of finger engagement. By simply applying finger pressure against the flat wall 62 of the disengaging arm 48, the engaging finger portion 45 pivots outwardly and disengages the bridge member 17.

Referring now to FIGS. 1, 7, 8A and 8B and 9, there will be described the construction and operation of the strap arresting assembly 23. Referring firstly to FIG. 7, the tension strap assembly 23 is shown as comprised of a stretchable member 70 in the form of a rubber strap provided with opposed end connectors 71. Strapping means in the form of a flat substantially non-stretchable strap 72 is secured to opposed end connectors 71 of the rubber strap 70 by suitable fastening means such as rivets 73. This strap may also be provided with reinforcing cables, such as steel or Kevlar cables 74 disposed longitudinally therein to prevent the strap from being cut by cutting implements such as scissors. A clamp 75 is secured to a loop end 76 provided at each free end of the strap 72. A pulling cable 77, herein a steel cable, is also secured to a respective one of the end connectors 71 at a securing end 78 by suitable means such as a rivet or bolt fastener 79. The free end of the cable 77 is provided with an enlarged hand-grasping member 80, herein shown as a large V-shaped member formed from two sections 80 and 80' interconnected by suitable means with the free end of the cable 77 having a loop 81 for attachment to a prong 82 provided in the hand-grasping member. Other suitable attachment means may also be provided for securing the free end of the cable 77 to the hand-grasping member. The cable also extends from the apex end 83 of the member 80 to facilitate the grasping of the member 80 with the cable 77 extending between the fingers of the user's hand.

In use, in order to attach the rack 10 of the present invention to the rooftop of a vehicle, one of the clamps, herein clamp 75', is secured to the gutter on one side of the vehicle. By pulling on the cable 77 from the other end of the rack, the rubber member 70 is stretched permitting the other clamp 75 to be easily engaged with the gutter as there is no pulling force in its strap 72. In order to now secure the rack to the vehicle, the window of one of the doors of the vehicle can be lowered and the enlarged hand-grasping member 80 is located inside the vehicle with the cable 77 passing through the small opening between the window and the door frame. Alternatively, the cable may be made to pass in the small opening between the vehicle frame and the door frame by opening the door and locating the large hand-grasping member 80 inside the vehicle and then closing the door shut on the cable 77.

Referring now to FIGS. 8A and 8B, there will be described the construction of the clamp 75 of the present invention. The clamp 75 is made to be removably attached to the strap 72 so that clamps of different shapes can be secured to the loop 76 to attach to vehicles having various types of gutters or without gutters. Accordingly, different shapes of clamps can be provided. As herein shown, the clamp 75 is provided with a strap attaching wall 85 and a clamping wall 86. Structural ribs 87 are stamped in the angulated portion of the clamp to add rigidity to the clamping wall. An H-shaped cavity 88 is provided in the attaching wall 85 to permit the loop portion 76 of the strap to be passed through the opposed slots 89 and 89' formed by this cavity and retained therein by the central opposed ribs 90 formed thereby. This attachment is well known in the art but has heretofore not been provided with such clamps to make them interchangeable and to permit replacement thereof.

FIG. 9 shows another alternative embodiment of the construction of the hand-grasping member 80 of the present invention. As herein shown, this member 80' may be provided with a through bore 91 which has an enlarged outer end to receive therein the loop end portion 81 of the cable 77. Of course, this loop end portion 81 would be formed after the cable is passed through the hand-grasping member 80'. By pulling the cable 77 through the member 80', the enlarged end 81 becomes engaged within the end cavity of the passage 91.

FIG. 10 is a cross-section view of the support base 11 illustrating the construction of a thin wall reinforcing metal bridge 92 which is secured inwardly within the support base 11 and which extends thereacross to the outer attachment posts 16. This metal bridge 92 is provided with a top wall 93 received in close proximity to the inner surface of the top wall of the support base and opposed side walls 94 having engaging flanges 95 to engage within locating slots molded within the inner wall of the support base. Because the ski rack is molded from injection molded plastics, a thin wall support base member is made possible by the insertion of this reinforcing metal bridge therefore maintaining the rack light and the material costs reasonable. The reinforcing metal bridge also permits the support base member to flex within acceptable tolerances and maintain its arcuate longitudinal.

It is within the ambit of the present invention to cover any obvious modifications of the preferred embodiments described herein, provided such modifications fall within the scope of the appended claims.

We claim:

1. A ski rack comprising a support base member, one or more fixed support posts secured to said support base member at predetermined positions and extending vertically therefrom, one or more removable ski retention posts removably connected to a respective one of said support posts, one or more fixed abutment members extending vertically from said base member and disposed in spaced parallel relationship with a respective one of said retention posts, said retention posts each having flexible biasing means in the form of one or more downwardly angulated flexible fingers projecting toward said abutment members in a ski receiving space defined between said posts and said abutment members for applying clamping pressure against a pair of skis supported on said base member in said ski receiving space, and a displaceable bridge member extending above and across said abutment members and said retention posts to provide access to said ski receiving space for insertion and removal of said skis, said removable ski retention post defining a housing having a base with a pair of spaced cavities extending inwardly from said base, said support posts being dimensioned to be received in close friction fit within a selected one of said cavities, said cavities of said retention post constituting adjustment means by permitting said angulated flexible fingers to be positioned at different distances from its associated abutment member, and attachment means to secure said rack to a vehicle.

2. A ski rack as claimed in claim 1 wherein there are at least two of said flexible arms, said arms extending from a side wall of said housing, each arm being formed as a thin flexible web.

3. A ski rack as claimed in claim 2 wherein there is further provided position indicating means to indicate which of said cavities is to receive said support post therein dependent on the type of skis to be supported in said ski receiving space.

4. A ski rack as claimed in claim 2 wherein said housing is an elongated rectangular hollow housing, said hollow housing having a central division wall extending transversely therein to divide said housing into two of said cavities, said flexible fingers extending from a top portion of an end wall of said housing, each said web having a tapered shape terminating in a narrow transverse abutment end edge.

5. A ski rack as claimed in claim 4 wherein said end wall of said housing is provided with a friction outer surface whereby to support a flat article spanning across two of said ski retention posts.

6. A ski rack as claimed in claim 1 wherein said abutment members are constituted by opposed bridge member attachment posts formed integral with said support base member, said attachment posts having a vertical bearing surface facing inwardly toward one another and a respective one of two of said support posts.

7. A ski rack as claimed in claim 6 wherein said bridge member is a bridge bar hinged at one end to an inner one of said attachment posts, and detachably connected at an opposed locking free end to an outer one of said attachment posts.

8. A ski rack as claimed in claim 7 wherein said support base member is provided with two ski support sections, each section having a set of said attachment posts in opposed side sections of said support base members, said outer one of said attachment posts of each section having a foot section projecting under said support base member for supporting said base member elevated over a surface of a vehicle to which said ski rack is secured.

9. A ski rack as claimed in claim 7 wherein said outer one of said attachment posts has a foot section projecting under said support base member, there being an outer one of said attachment posts at opposed ends of said support base member for supporting said base member elevated over a surface portion of a vehicle to which said ski rack is secured, and key operated lock means in said outer attachment posts for locking said bridge member thereto.

10. A ski rack as claimed in claim 9 wherein said key operated lock means comprises a pivotally biased locking lever having a locking finger normally biased to a locking position by spring means to engage with said locking free end of said bridge bar, a locking lever disengaging arm connected to said locking finger and pivotally mounted on a pivot in said outer attachment post for retracting said locking lever from engagement by causing pivotal movement of said lever, and a key operated arresting member for obstructing said disengaging arm to prevent disengagement of said locking finger when placed in a locked position by a key 11. A ski rack as claimed in claim 10 wherein said key arresting member is an arresting bar located in a key lock cylinder and axially displaceable therein by rotation of said key, said arresting bar having an arresting free end portion displaceable for obstruction with an abutment end of an arresting arm formed with said disengaging arm.

12. A ski rack as claimed in claim 11 wherein said locking finger is engageable within a locking slot provided in an outer wall of said locking free end of said bridge bar, said locking finger having a slot engaging end having a lower retention wall to engage within said locking slot to secure said free end on a top wall of said outer attachment post, said slot engaging finger having a sloped outer wall for sliding engagement with an angulated pusher edge of said locking free end of said bridge bar to cause said locking finger to pivot outwardly against said spring bias when said free end is lowered on said top wall and with the application of pressure, said locking finger automatically engaging into said slot when positioned in alignment therewith.

13. A ski rack as claimed in claim 12 wherein said key operated lock means is secured within a lock housing retained within said outer attachment post, said locking lever being retained on a hinge pin, a spring secured about said hinge pin and having an arm in abutment with said disengaging arm for biasing said locking finger to said locking position, said key cylinder being located in a cylinder cavity and retained therein by said arresting bar, said locking finger and disengaging arm being integrally formed and having a flat outer wall extending outwardly of said outer attachment post, said arresting arm being an arcuate lower wall extending inwardly into said locking housing from a lower edge of said disengaging arm.

14. A ski rack as claimed in claim 1 wherein said attachment means is a tensioning assembly comprised of a stretchable member retained captive in said support base member, strapping means secured to opposed ends of said stretchable member and protruding outwardly from outer attachment posts of said rack, and a detachable clamp secured to an outer free end of said strapping means for attachment to a vehicle edge member.

15. A ski rack as claimed in claim 4 wherein a pulling cable is secured at an inner end to said tensioning assembly for stretching said stretchable member, said pulling cable having an enlarged hand-grasping member secured to a free end thereof for pulling on said cable, said hand-grasping member being positionable inside a vehicle with said cable extending through a space between a displaceable closure of said vehicle to secure said ski rack to said vehicle, said strapping means being a rubber strap having opposed end connectors, said strapping means being a flat strap secured to a respective one of said end connectors.

16. A ski rack as claimed in claim 15 wherein said flat strap is provided with reinforcing cables therein, said strap being formed from substantially non-stretchable material.

17. A ski rack as claimed in claim 14 wherein said clamp has a strap attaching wall and a clamping wall, an H-shaped cavity in said strap attaching wall to permit a loop formed in an outer free end of said strap to be detachably secured to said clamp.

18. A ski rack as claimed in claim 15 wherein said pulling cable is at least one wire cable secured at said inner end to one of said connectors, said pulling cable being longer than said flat strap, said hand-grasping means being a V-shaped member, said cable extending from an apex section of said V-shaped member.

19. A ski rack as claimed in claim 1 wherein said support base member is a hollow arm extending across outer attachment posts, and a reinforcing metal bridge secured inwardly across said hollow arm to provide structural strength to said base member.

20. A ski rack as claimed in claim 19 wherein said base member, said outer attachment posts, said support posts and said abutment members are integrally formed from two longitudinal plastic molded shells interconnected together with said bridge member and a key operated lock means and said attachment means retained captive by said shells.

21. A ski rack as claimed in claim 20 wherein said abutment members are each provided with a vertical rubber bumper secured in a vertical end wall facing said flexible arm of its associated retention post on an opposed side of said ski receiving space.

22. A ski rack as claimed in claim 7 wherein said bridge bar is spaced from a top end of said ski retention posts, an elongated gasket of flexible friction material retained in a lower wall of said bridge bar and closely spaced in alignment with said posts, and a friction cap secured in said top end of said ski retention post, said shoes and said elongated gasket constituting a further clamping means for supporting a flat article therebetween.

23. A ski rack comprising a support base member, opposed support legs for supporting said base member elevated over a surface portion of a vehicle to which said support base member is secured, ski retention means for securing portions of one or more pairs of skis disposed transversely across said support base member, and ski rack attachment means for securing said rack to said vehicle, said attachment means being comprised by a tensioning assembly comprised of a stretchable member retained captive in said support base member, strapping means secured at opposed ends of said stretchable member and having an attachment end portion protruding from each of opposed ends of said rack, a retention clamp secured to each attachment end portion for securement to a vehicle, and a pulling means attached to said tensioning assembly for stretching said stretchable member, said pulling means having an enlarged hand-grasping member secured to a free end thereof for pulling on said cable, said hand-grasping member being positionable inside a vehicle with said cable extending through a space between a displaceable closure of said vehicle to secure said ski rack to said vehicle.

24. A ski rack as claimed in claim 23 wherein said strapping means is a rubber strap having opposed end connectors, said strapping means being a flat strap secured to a respective one of said end connectors.

25. A ski rack as claimed in claim 24 wherein said flat strap is provided with reinforcing cables therein, said strap being formed from substantially non-stretchable material.

26. A ski rack as claimed in claim 24 wherein said clamp is a detachable clamp, said clamp having a strap attaching wall and a clamping wall, an H-shaped cavity in said strap attaching wall to permit a loop formed in an outer free end of said strap to be detachably secured to said clamp.

27. A ski rack as claimed in claim 24 wherein said pulling cable is at least one wire cable secured at said inner end to one of said connectors, said pulling cable being longer than said flat strap, said hand-grasping means being a V-shaped member, said cable extending from an apex section of said V-shaped member.

28. A ski rack as claimed in claim 23 wherein said ski retention means is constituted by one or more adjustable ski retention posts secured to said support base member and extending vertically therefrom, one or more abutment members extending vertically from said base member and disposed in spaced aligned relationship with a respective one of said retention posts, said retention posts each having flexible biasing means projecting toward said abutment members in a ski receiving space defined between said posts and said abutment members for applying clamping pressure against a pair of skis supported on said base member in said ski receiving space, and a bridge member extending above and across said abutment members and said retention posts, and attachment means to secure said rack to a vehicle, and a bridge member extending above and across said abutment members and said retention posts.

29. A ski rack as claimed in claim 28 wherein said flexible biasing means is constituted by one or more downwardly angulated projecting flexible fingers.

30. A ski rack as claimed in claim 29 wherein each said adjustable ski retention post comprises a post housing having a base with a pair of spaced cavities extending inwardly from said base, said support base member having one or more support posts immovably secured thereto at predetermined positions with respect to said abutment members, said support posts being dimensioned to be received in close friction fit within a selected one of said cavities, said cavities of said retention post permitting said angulated flexible fingers to be positioned at different distances from its associated abutment member, and position indicating means to indicate which of said cavities is to receive said support post therein dependent on the type of skis to be supported in said ski receiving space.

* * * * *